United States Patent
Stephens et al.

(10) Patent No.: US 9,009,450 B2
(45) Date of Patent: Apr. 14, 2015

(54) MIXED OPERAND SIZE INSTRUCTION PROCESSING FOR EXECUTION OF INDIRECT ADDRESSING LOAD INSTRUCTION SPECIFYING REGISTERS FOR DIFFERENT SIZE OPERANDS

(75) Inventors: Nigel John Stephens, Cambridge (GB); David James Seal, Cambridge (GB)

(73) Assignee: ARM Limited, Cambridge (GB)

( * ) Notice: Subject to any disclaimer, the term of this patent is extended or adjusted under 35 U.S.C. 154(b) by 603 days.

(21) Appl. No.: 13/353,805

(22) Filed: Jan. 19, 2012

(65) Prior Publication Data
US 2012/0233444 A1 Sep. 13, 2012

(30) Foreign Application Priority Data
Mar. 8, 2011 (GB) .................................. 1103891.6

(51) Int. Cl.
*G06F 9/312* (2006.01)
*G06F 9/30* (2006.01)
*G06F 9/345* (2006.01)
*G06F 9/355* (2006.01)

(52) U.S. Cl.
CPC ........ *G06F 9/30192* (2013.01); *G06F 9/30043* (2013.01); *G06F 9/345* (2013.01); *G06F 9/355* (2013.01); *G06F 9/3016* (2013.01)

(58) Field of Classification Search
CPC  G06F 9/30014; G06F 9/30112; G06F 9/3016
USPC ............ 712/210, 221, E9.017, E9.021, E9.03
See application file for complete search history.

(56) References Cited

U.S. PATENT DOCUMENTS

| | | | | |
|---|---|---|---|---|
| 6,079,010 A * | 6/2000 | D'Arcy et al. | ................. | 712/212 |
| 6,678,806 B1 * | 1/2004 | Redford | ........................ | 711/154 |
| 8,082,419 B2 * | 12/2011 | Aldrich et al. | .................. | 712/22 |
| 8,108,658 B2 * | 1/2012 | Van Wel | ........................ | 712/225 |
| 8,443,168 B2 * | 5/2013 | Zeng | .............................. | 711/215 |
| 2009/0019266 A1 * | 1/2009 | Maeda | .......................... | 712/220 |
| 2012/0151189 A1 * | 6/2012 | Kruecken | ..................... | 712/220 |
| 2014/0013089 A1 * | 1/2014 | Henry et al. | ................. | 712/226 |

* cited by examiner

*Primary Examiner* — Kenneth Kim
(74) *Attorney, Agent, or Firm* — Nixon & Vanderhye P.C.

(57) ABSTRACT

A data processing system 2 includes a processor core 4 and a memory 6. The processor core 4 includes processing circuitry 12, 14, 16, 18, 26 controlled by control signals generated by decoder circuitry 24 which decodes program instructions. The program instructions include mixed operand size instructions (either load/store instructions or arithmetic instructions) which have a first input operand of a first operand size and a second input operand of a second input operand size where the second operand size is smaller than the first operand size. The processing performed first converts the second operand so as to have the first operand size. The processing then generates a third operand using as inputs the first operand of the first operand size and the second operand now converted to have the first operand size.

15 Claims, 8 Drawing Sheets

Instruction class name: Load-store register
Qualifier: (register offset)
Instruction class ID: (dst_regoff) — 68

| Mnemonic | Qualifier | Syntax form | variant | Opcode V opcsize | option: S xtx x | Registers Rt | Rn | Rm | Status | Description |
|---|---|---|---|---|---|---|---|---|---|---|
| | | | | xxxxx | | | | | | UNDEFINED |
| STRB | w | 32 | 0 | 00000 | | any | any | any | Gm | Store byte from Wt to memory addressed by Xn|SP plus adjusted register Xm|Wm. |
| STRH | w | 32 | 1 | 00001 | | any | any | any | Gm | Store halfword from Wt to memory addressed by Xn|SP plus adjusted register Xm|Wm. |
| STR | w | 32 | 2 | 00010 | | any | any | any | Gm | Store word from Wt to memory addressed by Xn|SP plus adjusted register Xm|Wm. |
| STR | x | 64 | 3 | 00011 | | any | any | any | Gm | Store doubleword from Xt to memory addressed by Xn|SP plus adjusted register Xm|Wm. |
| LDRB | w | 32 | 0 | 00100 | | any | any | any | Gm | Load byte from memory addressed by Xn|SP plus adjusted register Xm|Wm, then zero-extend it into Wt. |
| LDRH | w | 32 | 1 | 00101 | | any | any | any | Gm | Load halfword from memory addressed by Xn|SP plus adjusted register Xm|Wm, then zero-extend it into Wt. |
| LDR | w | 32 | 2 | 00110 | | any | any | any | Gm | Load word from memory addressed by Xn|SP plus adjusted register Xm|Wm to Wt. |
| LDR | x | 64 | 3 | 00111 | | any | any | any | Gm | Load doubleword from memory addressed by Xn|SP plus adjusted register Xm|Wm to Xt. |
| LDRSB | x | 64 | 0 | 01000 | | any | any | any | Gm | Load byte from memory addressed by Xn|SP plus adjusted register Xm|Wm, then sign-extend it into Xt. |
| LDRSH | x | 64 | 1 | 01001 | | any | any | any | Gm | Load halfword from memory addressed by Xn|SP plus adjusted register Xm|Wm, then sign-extend it into Xt. |
| LDRSW | x | 64 | 2 | 01010 | | any | any | any | Gm | Load word from memory addressed by Xn|SP plus adjusted register Xm|Wm, then sign-extend it into Xt. |
| PRFM | (none) | P | 3 | 01011 | | pfop | any | any | Gm | Prefetch memory addressed by Xn|SP plus adjusted register Xm|Wm. |
| LDRSB | w | 32 | 0 | 01100 | | any | any | any | Gm | Load byte from memory addressed by Xn|SP plus adjusted register Xm|Wm, then sign-extend it into Wt. |
| LDRSH | w | 32 | 1 | 01101 | | any | any | any | Gm | Load halfword from memory addressed by Xn|SP plus adjusted register Xm|Wm, then sign-extend it into Wt. |
| | | | | 0111x | | | | | | UNDEFINED |
| STR | b | B | 0 | 10000 | | any | any | any | Gm | Store byte from FP/SIMD register Bt to memory addressed by Xn|SP plus adjusted register Xm|Wm. |
| STR | h | H | 1 | 10001 | | any | any | any | Gm | Store halfword from FP/SIMD register Ht to memory addressed by Xn|SP plus adjusted register Xm|Wm. |
| STR | s | S | 2 | 10010 | | any | any | any | Gm | Store word from FP/SIMD register St to memory addressed by Xn|SP plus adjusted register Xm|Wm. |
| STR | d | D | 3 | 10011 | | any | any | any | Gm | Store doubleword from FP/SIMD register Dt to memory addressed by Xn|SP plus adjusted register Xm|Wm. |
| LDR | b | B | 0 | 10100 | | any | any | any | Gm | Load byte from memory addressed by Xn|SP plus adjusted register Xm|Wm to FP/SIMD register Bt. |
| LDR | h | H | 1 | 10101 | | any | any | any | Gm | Load halfword from memory addressed by Xn|SP plus adjusted register Xm|Wm to FP/SIMD register Ht. |
| LDR | s | S | 2 | 10110 | | any | any | any | Gm | Load word from memory addressed by Xn|SP plus adjusted register Xm|Wm to FP/SIMD register St. |
| LDR | d | D | 3 | 10111 | | any | any | any | Gm | Load doubleword from memory addressed by Xn|SP plus adjusted register Xm|Wm to FP/SIMD register Dt. |
| | | | | 11xx0 | | | | | | UNDEFINED |
| | | | | 11x0x | | | | | | UNDEFINED |
| STR | q | Q | 3 | 11011 | | any | any | any | Gm | Store two consecutive doublewords from FP/SIMD register Qt to memory addressed by Xn|SP plus adjusted register Xm|Wm. |
| LDR | q | Q | 3 | 11111 | | any | any | any | Gm | Load two consecutive doublewords from memory addressed by Xn|SP plus adjusted register Xm|Wm to FP/SIMD register Qt. |

FIG. 5A

Future enhancement note: Opcodes 11x0x is the obvious extension space for further sizes of scalar.

Mnemonic aliases:

| Alias: Mnemonic | Qualifier | Syntax form variant | If condition below holds | Is equivalent to: Mnemonic | Dissem | Description |
|---|---|---|---|---|---|---|

Encoding: ⌐70

| 31 30 29 28 27 26 25 24 23 22 21 | 20 19 18 17 16 | 15 14 13 12 11 | 10 9 8 7 6 | 5 4 3 2 1 0 |
|---|---|---|---|---|
| size | 1 1 1 | V | 0 0 | opc | 1 1 | Rm | option | S | 1 0 | Rn | Rt |

Assembler syntax (32): <mnemonic> <Wt>, [<Xn|SP>, <Rm>{, <extend> {#<amount>}}]
Assembler syntax (64): <mnemonic> <Xt>, [<Xn|SP>, <Rm>{, <extend> {#<amount>}}]
Assembler syntax (B): <mnemonic> <Bt>, [<Xn|SP>, <Rm>{, <extend> {#<amount>}}]
Assembler syntax (H): <mnemonic> <Ht>, [<Xn|SP>, <Rm>{, <extend> {#<amount>}}]
Assembler syntax (S): <mnemonic> <St>, [<Xn|SP>, <Rm>{, <extend> {#<amount>}}]
Assembler syntax (D): <mnemonic> <Dt>, [<Xn|SP>, <Rm>{, <extend> {#<amount>}}]
Assembler syntax (Q): <mnemonic> <Qt>, [<Xn|SP>, <Rm>{, <extend> {#<amount>}}]
Assembler syntax (P): <mnemonic> <prfop>, [<Xn|SP>, <Rm>{, <extend> {#<amount>}}]

where:
<mnemonic> Is one of the mnemonics listed above for the syntax form, and is encoded in the "V", "size" and "opc" fields.
<Wt> Is the 32-bit general register to be transferred, encoded in the "Rt" field.
<Xt> Is the 64-bit general register to be transferred, encoded in the "Rt" field.
<Bt> Is the 8-bit FP/SIMD register to be transferred, encoded in the "Rt" field.
<Ht> Is the 16-bit FP/SIMD register to be transferred, encoded in the "Rt" field.
<St> Is the 32-bit FP/SIMD register to be transferred, encoded in the "Rt" field.
<Dt> Is the 64-bit FP/SIMD register to be transferred, encoded in the "Rt" field.
<Qt> Is the 128-bit FP/SIMD register to be transferred, encoded in the "Rt" field.
<Xn|SP> Is the 64-bit base register or SP, encoded in the "Rn" field.
<extend> Is one of the following extend/shift operations encoded in the "option" field:
*UXTW (010)' zero extend and optional left shift of 32-bit index register
*LSL (011)' optional left shift of 64-bit index register, and the default if absent FIG. 5A (continued)

<Rn> * SXTW("110") sign extend and optional left shift of 32-bit index register
* SXTX("111") non-preferred encoding for left shift of 64-bit index register.
Is the general purpose index register, encoded in the "Rm" field, with one of the following forms:
* Xm   64-bit index register when <extend>   is explicitly or implicitly LSL or SXTX
* Wm   32-bit index register otherwise.

<amount> 0 The left shift amount, which must be 0 or absent, though non-optional if <extend> is explicitly LSL. Encoded in the "S" field as '0' if absent, or '1' if present.
<amount> 1 The left shift amount of 0 or 1, defaulting to 0 if absent, though non-optional if <extend> is explicitly LSL. Encoded in the "S" field as '0' or '1' respectively.
<amount> 2 The left shift amount of 0 or 2, defaulting to 0 if absent, though non-optional if <extend> is explicitly LSL. Encoded in the "S" field as '0' or '1' respectively.
<amount> 3 The left shift amount of 0 or 3, defaulting to 0 if absent, though non-optional if <extend> is explicitly LSL. Encoded in the "S" field as '0' or '1' respectively.
<prfop> Is the prefetch operation type, encoded as a 5-bit immediate in the "Rt" field.
* prfop<4:3>  00=preload data, 10=prepare for store, x1=no-op
* prfop<2:1>  00=target L1 cache, 01=target L2 cache, 10=target L3 cache, 11=no-op
* prfop<0>    0=non-streaming (temporal) preload, 1=streaming (non-temporal) preload

| Instruction class name: | Add-subtract |
| --- | --- |
| Qualifier: | (extended register) |
| Instruction class ID | addsub_ext |

Mnemonics (completed):

| Mnemonic | Qualifier | Syntax form variant | Opcode opcS sf | optoption:imm 3 | Registers Rd Rn Rm | Status | Description |
| --- | --- | --- | --- | --- | --- | --- | --- |
| | | , , , | xxx | 1xxxxxx | any any any | UNDEFINED | |
| | | , , , | xxx | x1xxxxxx | any any any | UNDEFINED | |
| | | , , , | xxx | xxxx1xx | any any any | UNDEFINED | |
| ADD | we | , , 32 | 000 | 00xxxxxx | any any any | Gm | 32-bit addition Wd = Wn + LSL(extend(Wm), amount). |
| ADD | xe | , , 64 | 000 | 00xxxxxx | any any any | Gm | 64-bit addition Xd = Xn + LSL(extend(Xm), amount). |
| ADDS | we | , , 32S | 001 | 00xxxxxx | any any any | Gm | 32-bit addition Wd = Wn + LSL(extend(Wm), amount), setting the condition flags. |
| ADDS | xe | , , 64S | 001 | 00xxxxxx | any any any | Gm | 64-bit addition Xd = Xn + LSL(extend(Xm), amount), setting the condition flags. |
| SUB | we | , , 32 | 010 | 00xxxxxx | any any any | Gm | 32-bit subtraction Wd = Wn - LSL(extend(Wm), amount). |
| SUB | xe | , , 64 | 010 | 00xxxxxx | any any any | Gm | 64-bit subtraction Xd = Xn - LSL(extend(Xm), amount). |
| SUBS | we | , , 32S | 011 | 00xxxxxx | any any any | Gm | 32-bit subtraction Wd = Wn - LSL(extend(Wm), amount), setting the condition flags. |
| SUBS | xe | , , 64S | 011 | 00xxxxxx | any any any | Gm | 64-bit subtraction Xd = Xn - LSL(extend(Xm), amount), setting the condition flags. |

Mnemonic aliases:

| Alias: Mnemonic | Qualifier | Syntax form variant | Opcode | If condition below holds | Is equivalent to: Mnemonic | Disasm Description |
| --- | --- | --- | --- | --- | --- | --- |
| CMN | we | 32C 2 | | Unconditionally | ADDS WZR, <Wn|WSP>, <Wm>{, <extend> {#<amount>}} | Alias 32-bit compare negative Wn + LSL(extend(Wm), amount), discarding the result, but setting the condition flags. |
| CMN | xe | 64C 3 | | Unconditionally | ADDS XZR, <Xn|SP>, <Xm>{, <extend> {#<amount>}} | Alias 64-bit compare negative Xn + LSL(extend(Xm), amount), discarding the result, but setting the condition flags. |
| CMP | we | 32C 2 | | Unconditionally | SUBS WZR, <Wn|WSP>, <Wm>{, <extend> {#<amount>}} | Alias 32-bit compare Wn - LSL(extend(Wm), amount), discarding the result, but setting the condition flags. |
| CMP | xe | 64C 3 | | Unconditionally | SUBS XZR, <Xn|SP>, <Xm>{, <extend> {#<amount>}} | Alias 64-bit compare Xn - LSL(extend(Xm), amount), discarding the result, but setting the condition flags. |

Encoding:

| 31 30 29 28 27 26 25 24 23 22 21 | 20 19 18 17 16 | 15 14 13 | 12 11 10 | 9 8 7 6 5 | 4 3 2 1 0 |
| --- | --- | --- | --- | --- | --- |
| sf op S 0 1 0 1 1 1 opt 1 1 | Rm | option | imm3 | Rn | Rd |

72

Assembler syntax (32S): <mnemonic> <Rd>, <Rn|WSP>, <Wm>{, <extend> {#<amount>}}
Assembler syntax (32C): <mnemonic> <Wn|WSP>, <Wm>{, <extend> {#<amount>}}
Assembler syntax (32): <mnemonic> <Rd|WSP>, <Rn|WSP>, <Wm>{, <extend> {#<amount>}}
Assembler syntax (64S): <mnemonic> <Xd>, <Xn|SP>, <Rm>{, <extend> {#<amount>}}
Assembler syntax (64C): <mnemonic> <Xn|SP>, <Rm>{, <extend> {#<amount>}}
Assembler syntax (64): <mnemonic> <Rd|SP>, <Xn|SP>, <Rm>{, <extend> {#<amount>}} where:

<mnemonic> Is one of the mnemonics listed above for the syntax form, and is encoded in the "op" and "sf" fields.
<Wd> Is the destination 32-bit general register, encoded in the "Rd" field.
<Xd> Is the destination 64-bit general register, encoded in the "Rd" field.
<Wd|WSP> Is the destination 32-bit register or SP, encoded in the "Rd" field.
<Xd|SP> Is the destination 64-bit register or SP, encoded in the "Rd" field.
<Wn|WSP> Is the first source 32-bit register or SP, encoded in the "Rn" field.
<Xn|SP> Is the first source 64-bit register or SP, encoded in the "Rn" field.
<Wm> Is the second source 32-bit general register, encoded in the "Rm" field.
<Rm> Is the second source general register, encoded in the "Rm" field, with one of the following forms:
 * Xm   64-bit register name when <extend> is explicitly or implicitly UXTX, SXTX or LSL
 * Wm   32-bit register name otherwise.

<extend> 0 Is one of the following options, with the specified encodings in the "option" field.
 * One of SXTB ('100') or SXTH ('101') to specify sign extension of the bottom byte/halfword followed by a left shift
 * One of UXTB ('000') or UXTH ('001') to specify zero extension of the bottom byte/halfword followed by a left shift
 * UXTW ('010') to specify a left shift. If and only if at least one of "Rd" and "Rn" fields is '11111', then the alias LSL is preferred and is the default if absent.
 * One of SXTW ('110'), SXTX ('111'), and UXTX ('011') to specify a non-preferred left shift.

<extend> 1 Is one of the following options, with the specified encodings in the "option" field.
 * One of SXTB ('100'), SXTH ('101') or SXTW ('110') to specify sign extension of the bottom byte/halfword/word followed by a left shift
 * One of UXTB ('000'), UXTH ('001') or UXTW ('010') to specify zero extension of the bottom byte/halfword/word followed by a left shift
 * UXTX ('011') to specify a left shift. If and only if the "Rn" field is '11111', then the alias LSL is preferred and is the default if absent.
 * SXTX ('111') to specify a non-preferred left shift.

<extend> 2 Is one of the following options, with the specified encodings in the "option" field.
 * One of SXTB ('100') or SXTH ('101') to specify sign extension of the bottom byte/halfword followed by a left shift
 * One of UXTB ('000') or UXTH ('001') to specify zero extension of the bottom byte/halfword followed by a left shift
 * UXTW ('010') to specify left shift. If and only if the "Rn" field is '11111', then the alias LSL is preferred and is the default if absent.
 * One of SXTW ('110'), SXTX ('111'), and UXTX ('011') to specify a non-preferred left shift.

<extend> 3 Is one of the following options, with the specified encodings in the "option" field.
 * One of SXTB ('100'), SXTH ('101') or SXTW ('110') to specify sign extension of the bottom byte/halfword followed by a left shift
 * One of UXTB ('000'), UXTH ('001') or UXTW ('010') to specify zero extension of the bottom byte/halfword followed by a left shift
 * UXTX ('011') to specify a left shift. If and only if the "Rn" field is '11111', then the alias LSL is preferred and is the default if absent.
 * SXTX ('111') to specify a non-preferred left shift.

<amount> The left shift amount in the range 0 to 3, defaulting to 0 and encoded in the "imm3" field. Non-optional if <extend> is explicitly LSL.

MIXED OPERAND SIZE INSTRUCTION PROCESSING FOR EXECUTION OF INDIRECT ADDRESSING LOAD INSTRUCTION SPECIFYING REGISTERS FOR DIFFERENT SIZE OPERANDS

BACKGROUND OF THE INVENTION

This application claims priority to GB Application No. 1103891.6 filed Mar. 8, 2011, the entire contents of which are incorporated herein by reference.

1. Field of the Invention

This invention relates to the field of data processing systems. More particularly, this invention relates to the selection of which data processing operations to support with program instructions within a data processing system.

2. Description of the Prior Art

It is known to provide data processing systems which operate under the control of program instructions. The program instructions are decoded by decoder circuitry to generate control signals. These control signals control the processing circuitry to perform data processing operations specified by those program instructions. An important aspect of data processing system design is the selection of which program instructions to support within a data processing apparatus. This selection is particularly important in the field of reduced instruction set computing (RISC) which is characterised by the native support of relatively few program instructions, but with each of these program instructions being able to execute rapidly and efficiently.

It is known to manipulate operand values of different bit sizes within a data processing system. For example, operands to be manipulated may be of a word length (32-bits), a double word length (64 bits), a half word length (16 bits) or a byte length (8 bits). Other operand widths are also possible. It is generally more efficient to use an operand size which is not too large for the typical values of the operand to be stored. It is wasteful of storage resources and energy to manipulate operands in, for example, the form of double words when the operand values are such that they can be fully represented as operands having a length of one byte.

A problem arises when it is desired to perform a data processing operation upon values which are stored within operands of different operand sizes. One way of dealing with this is to provide size conversion instructions which when executed change an operand of a first operand size to an operand of a second operand size, the second operand size being different to the first operand size. Once the two values to be manipulated have been placed into operands having the same operand size, then a data processing instruction which uses those operands as inputs may then be executed.

SUMMARY OF THE INVENTION

Viewed from one aspect the present invention provides apparatus for processing data comprising:
processing circuitry configured to perform data processing operations specified by program instructions;
a plurality of registers, each of said registers storing a scalar operand; and
decoder circuitry coupled to said processing circuitry and configured to decode said program instructions to generate control signals for controlling said processing circuitry to perform data processing operations specified by said program instructions; wherein
said decoder circuitry is configured to decode a mixed operand size instruction to generate control signals to control said processing circuitry to perform a mixed size data processing operation having:
  (i) a first input operand of a first operand size stored within a first register of said plurality of registers as specified by a first register specifying field within said mixed operand size instruction;
  (ii) a second input operand of a second operand size stored within a second register of said plurality of registers as specified by a second register specifying field within said mixed operand size instruction, said second operand size being less than said first operand size; and
  (iii) a third operand of a third operand size; and
said mixed size data processing operation including processing with a same effect as:
  (a) converting said second input operand from said second operand size to said first operand size; and
  (b) generating said third operand in dependence upon said first input operand with said first operand size and said second input operand with said first operand size.

The present techniques recognise that the need to insert additional instructions merely for the purpose of changing the bit size of operands before they are subsequently processed by a following program instruction is wasteful in terms of processing speed and energy consumption. The need to use these dedicated size conversion instructions may negate the storage and efficiency advantages achieved by storing operands with a smaller bit size. The present techniques overcome this problem by providing one or more mixed size data processing instructions that serve to both convert the input operands to have the same bit size and then to perform a data processing operation which generates a third operand and is dependent upon the first operand and the second operand which have previously been converted to have the same bit size.

It will be appreciated that the third operand which is generated by the data processing operation may have the same or a different size to the two input operands. For example, if the data processing operation was a multiply, then it is possible that the third operand may have twice the bit size. However, if the data processing operation was, for example, an addition, a subtraction, a logical operation or the like, then the third operand may conveniently have the same size as the first operand size.

The conversion performed to change the operand size could be undertaken in a variety of different ways. Two such ways which are desirable to support with the mixed operand size instructions are (i): the second input operand is sign extended from the second operand size to the first operand size; and (ii) the second input operand is zero extended from the second operand size to the first operand size.

The mixed operand size instructions can be provided in a variety of different forms useful in different circumstances. In some forms, generating of the third operand may include setting of one or more result flags within the apparatus. These result flags may, for example, indicate one or more of (i) the third operand is a zero; (ii) the third operand is negative; (iii) generating the third operand included generating an unsigned carry out bit; and (iv) generating the third operand included generating a signed overflow.

A further variant which is sufficiently useful in real world data processing tasks that it is worthwhile supporting within the mixed operand size instructions is one in which the generating of the third operand includes shifting the second input operand. These variants are useful in dealing with, for example, variable stride lengths when traversing a data structure. The shift amount that is employed may be specified by a field within the mixed operand size instruction, for example, as an immediate field or as an implied parameter, based upon a characteristic such as the size of a data value being subject to a load or store operation.

Within this context it is important that the manipulations performed are undertaken in an appropriate order. Different results may be generated if the manipulations are performed in different orders. In accordance with this reason, the generation has a same effect as if the shifting had been performed after the second input operand is converted to the first operand size.

It will be understood that the actual processing performed may not follow these steps, but what is significant is that the result is the same as if these steps had been followed in this order. The same is generally true of the above described manipulations. It will be understood by those in this technical field that many variations are possible of a given manipulation to be performed that will ultimately generate the same result and the present technique encompasses all of these variants.

The third operand when it is generated may be used in a variety of different ways. In some embodiments the third operand may be stored within a third register as specified by a third register specifying field within the mixed operand size instruction. The third operand thus directly forms the result of the mixed operand size instruction.

In this context, the generation performed may be an arithmetic operation performed upon the first input operand and the second input operand when they have been converted to have the same operand size.

The arithmetic operation could take a variety of forms. Particularly useful forms are an addition and a subtraction.

Another general type of mixed operand size instruction is one used within an apparatus including a memory where the third operand is used as an address value for one of a load operation and a store operation with that load operation or store operation being between a third register specified by a register specifying field within the mixed operand size instruction and the data value stored within the memory at the address value specified by the third operand. This type of instruction is particularly useful when addressing data structures, such as arrays.

Viewed from another aspect the present invention provides apparatus for processing data comprising:
   processing means for performing data processing operations specified by program instructions;
   a plurality of register means for storing data, each of said register means storing a scalar operand; and
   decoder means coupled to said processing means for decoding said program instructions to generate control signals for controlling said processing means to perform data processing operations specified by said program instructions; wherein
   said decoder means is configured to decode a mixed operand size instruction to generate control signals to control said processing circuitry to perform a mixed size data processing operation having:
      (i) a first input operand of a first operand size stored within a first register means of said plurality of register means as specified by a first register specifying field within said mixed operand size instruction;
      (ii) a second input operand of a second operand size stored within a second register means of said plurality of register means as specified by a second register specifying field within said mixed operand size instruction, said second operand size being less than said first operand size; and
      (iii) a third operand of a third operand size; and
   said mixed size data processing operation including processing with a same effect as:
      (a) converting said second input operand from said second operand size to said first operand size; and
      (b) generating said third operand in dependence upon said first input operand with said first operand size and said second input operand with said first operand size.

Viewed from a further aspect the present invention provides a method of processing data using processing circuitry configured to perform data processing operations specified by program instructions, a plurality of registers, each of said registers storing a scalar operand and decoder circuitry coupled to said processing circuitry and configured to decode said program instructions to generate control signals for controlling said processing circuitry to perform data processing operations specified by said program instructions, said method comprising the steps of:
   decoding a mixed operand size instruction to generate control signals to control said processing circuitry to perform a mixed size data processing operation having:
      (i) a first input operand of a first operand size stored within a first register of said plurality of registers as specified by a first register specifying field within said mixed operand size instruction;
      (ii) a second input operand of a second operand size stored within a second register of said plurality of registers as specified by a second register specifying field within said mixed operand size instruction, said second operand size being less than said first operand size; and
      (iii) a third operand of a third operand size; and
   said mixed size data processing operation including processing with a same effect as:
      (a) converting said second input operand from said second operand size to said first operand size; and
      (b) generating said third operand in dependence upon said first input operand with said first operand size and said second input operand with said first operand size.

Further complementary aspects of the invention include a computer program product storing in non-transitory form a computer program including at least one mixed operand size instruction for controlling a computer to perform the above described method as well as a virtual machine comprising a computer controlled by a computer program to provide an execution environment for executing a program in accordance with the above described techniques.

The above, and other objects, features and advantages of this invention will be apparent from the following detailed description of illustrative embodiments which is to be read in connection with the accompanying drawings.

BRIEF DESCRIPTION OF THE DRAWINGS

FIGS. 5A and 5B shows details of the encoding and operation of a plurality of variants of a mixed operand size instruction being a load/store instruction; and FIG. 6 shows details of the encoding and operation of a plurality of variants of a mixed operand size instruction being an add/subtract instruction.

DESCRIPTION OF THE EMBODIMENTS

Figure 1:
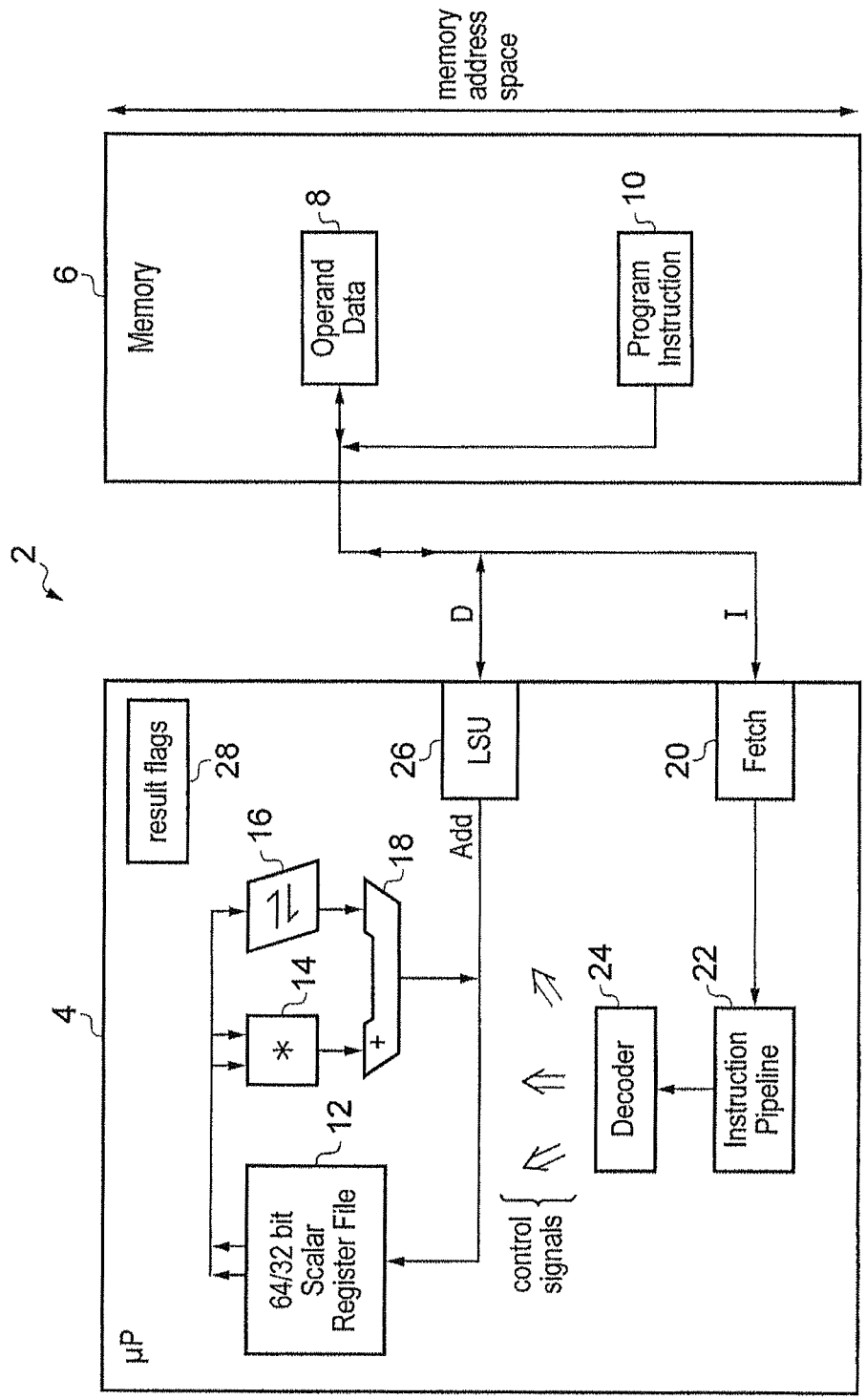
FIG. 1 schematically illustrates a data processing system for performing data processing operations under control of program instructions including mixed operand size instructions.

FIG. 1 schematically illustrates a data processing apparatus 2 having a processor core 4 and a memory 6. The memory 6 stores operand data 8 to be manipulated and program instructions 10 for controlling the processor core 4 to perform desired processing operations. The processor core 4 includes processing circuitry illustrated in this example in the form of a scalar register file 12, a multiplier 14, a shifter 16 and an adder 18 which together forming a scalar integer data path. The scalar register file 12 may, for example, contain 31 registers with each of these registers storing either a 64-bit value or a 32-bit value. This is one source of the mixed operand sizes as previously discussed.

The processor core 4 also includes fetch circuitry 20 for fetching program instructions 10 from the memory 6 and supplying them to an instruction pipeline 22 where they are processed with a view to performing the data processing manipulation specified by those program instructions. Decoder circuitry 24 is responsive to the program instructions progressing along the instruction pipeline 22 to generate control signals which are used to control the processing circuitry 12, 14, 16, 18. The processing circuitry further includes a load/store unit 26 as the processing operations to be performed may include load operations and store operations. A load operation copies a data value from the memory 6 into one of the registers of the scalar register file 12. Conversely, a store operation copies a data value from one of the registers of the scalar register file 12 into the memory 6. The memory 6 is addressed with an address value lying within the memory address space of the memory 6. This address value may be formed using a data manipulation involving operands of mixed sizes as will be discussed further below.

Also illustrated in FIG. 1 are result flags 28. These result flags are set when data processing operations are executed to indicate differing characteristics of the results of those data processing operations. For example, the result flags may indicate one or more of: (i) the result operand is zero; (ii) the result operand is negative; (iii) generating the result operand included generating an unsigned carry out bit from the result operand; and (iv) that generating the third operand included generating a signed overflow from the signed operand. These result flags may also be set by the mixed operand size instructions described further below. It will be appreciated by those in this technical field that the processor core 4 will typically include many further elements but that these have been omitted from FIG. 1 for the sake of clarity.

In operation, a mixed operand size instruction may be fetched from the memory 6 by the fetch circuitry 20 and supplied to the instruction pipeline 22. When this mixed operand size instruction reaches the decode stage of the instruction pipeline, the decoder circuitry 24 decodes the mixed operand size instruction and generates control signals which control the processing circuitry 12, 14, 16, 18, 26 to perform a specified processing operation. This processing operation has a first input operand of a first operand size stored within a first register of the scalar register file 12 as specified by a first register specifying field within the mixed operand size instruction. The mixed size data processing operation further has a second input operand of a second operand size stored within a second register of the scalar register file 12 as specified by a second register specifying field within the mixed operand size instruction. This second operand size is less than the first operand size. For example, the second operand size may be 32-bits and the first operand size may be 64-bits. It is also possible that the second operand size could be 16-bits or 8-bits. Furthermore, it is also possible that the first operand size may be different from 64-bits, such as 32-bits or 16-bits. The operand sizes may also be larger, such as 128-bits.

The mixed size data processing instruction has a third operand of a third operand size. This third operand may be a result value itself which is stored into a third register of the scalar register file 12 in the case of an arithmetic instruction, such as an addition or subtraction. Alternatively, the third operand may be used when the mixed operand size instruction is a load instruction or a store instruction as the address value to be addressed within the memory 6 for a load operation or a store operation taking place between a third register of the scalar register file as specified by a third register specifying field within the mixed operand size instruction and a data value stored within the memory 6 at the calculated address.

The processing operations performed by the processing circuitry 12, 14, 16, 18, 26 in response to the control signals generated by the decoder circuitry 24 include converting the second input operand from the second operand size to the first operand size. For example, the second input operand may be converted from a 32-bit operand to a 64-bit operand. When the second input operand has been converted to the first operand size, then the third operand may be generated in on the first input operand and the second input operand now sharing the first operand size. In this way a size conversion is combined with a further manipulation, such as an arithmetic operation or a load/store operation, within the same instruction being a mixed operand size instruction. This improves the efficiency of operation since a separate stand-alone size conversion instruction/operation is not required. The third operand may also share the first operand size.

The size conversion performed may sign extend the second input operand from the second operand size to the first operand size or alternatively may zero extend the second operand from the second operand size to the first operand size. These alternatives may be specified by option specifying bits within the mixed operand size instruction as will, be described further below. The generation of the third operand can optionally include shifting of the second input operand. The shift size may be specified by a field within the mixed operand size instruction either explicitly or implicitly as part of the opcode. The processing is performed in a manner such that the result generated as the third operand is the same as when that produced by first converting the second input operand to the first operand size followed by the shift operation.

As previously mentioned, the third operand may be stored within a third register as specified by a third register specifying field within the mixed operand size instruction. This type of mixed operand size instruction is well suited to supporting arithmetic operations, such as addition and subtraction. Another possibility is that the third operand serves as an address value for addressing the memory 6 when the mixed operand size instruction is a load instruction or a store instruction.

Figure 2:
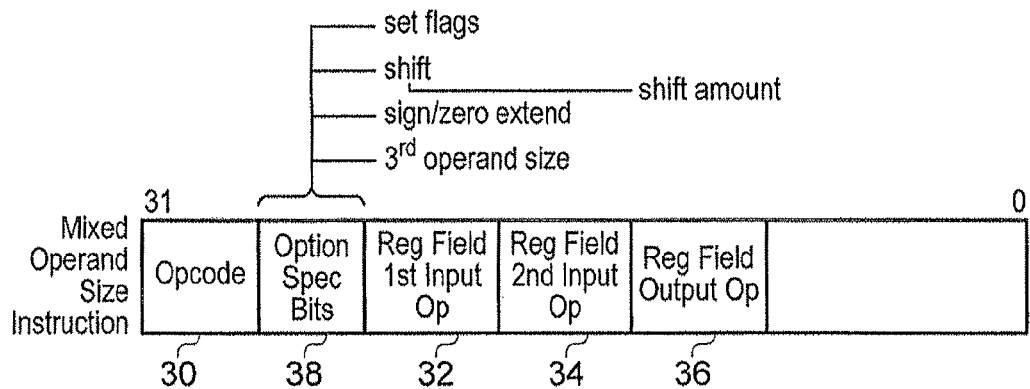
FIG. 2 schematically illustrates a mixed operand size instruction.

FIG. 2 schematically illustrates a mixed operand size instruction. As will be seen, this mixed operand size instruction includes an opcode 30 which specifies firstly that the instruction is a mixed operand size instruction and further the particular type of mixed operand size instruction, namely either a load/store instruction or an arithmetic instruction having input operands of different sizes. The mixed operand size instruction further includes a first register field 32 specifying a register storing a first input operand, a second register field 34 specifying a register storing a second input operand and a third register field 36 specifying a register storing an output operand. The mixed operand size instruction also includes option specifying bits 38 which can be used to specify different variants of the different types of mixed operand size instructions. These variants include ones which do or do not set the result flags, do or do not involve a shift and the amount of that shift, whether the conversion utilises sign extension or zero extension and the operand size of the third operand. Further options may be specified for the mixed operand size instruction.

Figure 3:
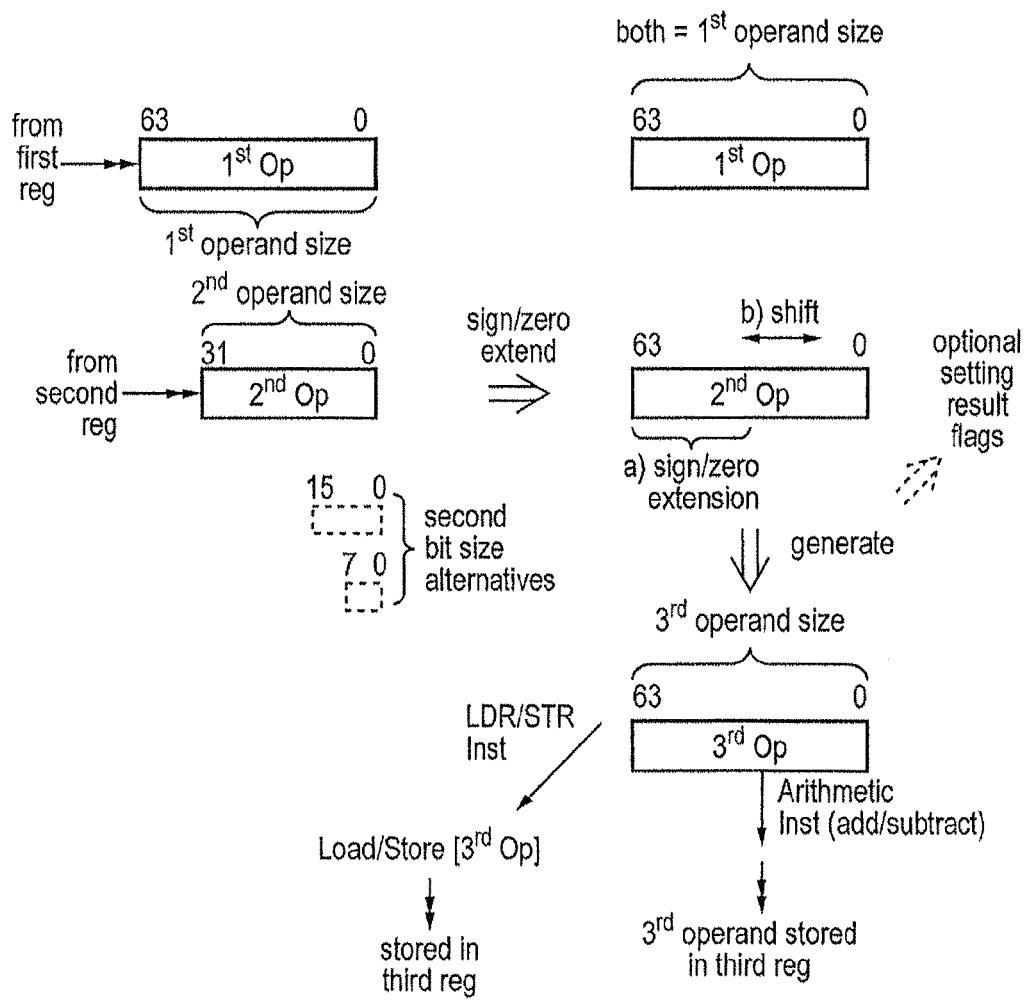
FIG. 3 schematically illustrates the conversion and generating steps which may be undertaken in response to a mixed operand size instruction.

FIG. 3 schematically illustrates the processing performed by the processing circuitry 12, 14, 16, 18, 26 of the processor core 4 when executing a mixed operand instruction. A first operand is read from a first register. The first operand has a first operand size, such as for example, 64-bits. A second operation with a second operand size, such as for example 32-bits, is read from a second register as specified by a second register specifying field. The second operand is then converted such that it has the same size as the first operand. This conversion includes either sign extension or zero extension into the most significant 32-bits in this example. The second operand after this sign extension or zero extension may then optionally be subject to a shift, such as a left shift by a shift amount specified or implied within the mixed operand size instruction. The result of the conversion is the first operand has the first operand size and the second operand has the first operand size.

The first operand and the converted second operand are then used to generate a third operand having a third operand size, which may for example be the same as the first operand size. This generation step may optionally set the result flags 28 as previously described. The generation may be an arithmetic operation performed with the first operand and the second operand providing two input operands. The arithmetic operation may, for example, be an addition or a subtraction.

At this point the illustration in FIG. 3 shows two alternative forms of the mixed operation size instruction. In the first form the mixed operand size instruction is a load instruction or a store instruction. In this case the third operand serves as the address value for the load operation or the store operation. The destination/target register for that load operation or store operation is specified within a third register specifying field 36 of the mix operand size instruction.

Another variant of the mixed operand size instruction is an arithmetic instruction, such as an addition or subtraction when the original first input operand and second input operand had different operand sizes. With these variants the third operand forms the result operand which is stored into a third register as specified by the third register specifying field 36.

Figure 4:
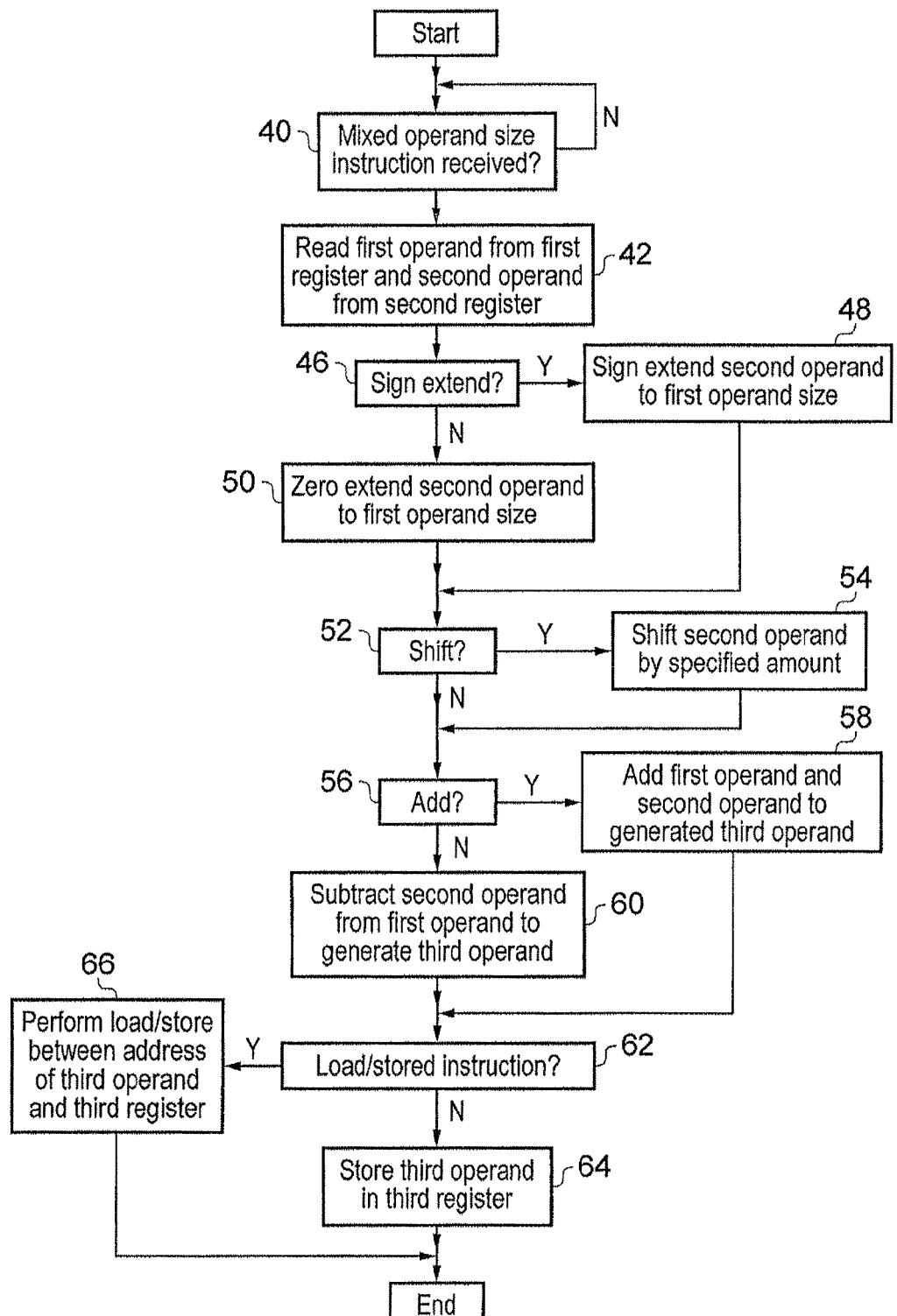
FIG. 4 is a flow diagram schematically illustrating the decoding and execution of a mixed operand size instruction.

FIG. 4 is a flow diagram schematically illustrating the processing performed by the processing circuitry 12, 14, 16, 18, 26 in response to the decoding of a mixed operand size instruction. It will be appreciated that the flow diagram of FIG. 4 shows this processing as being performed in a sequential manner. Those familiar with this technical field will realise that in practice the ordering of the operations may be varied and some of the operations may be performed in parallel. The present techniques encompass these alternatives.

At step 40 processing waits until a mixed operand size instruction is received. At step 42 a first operand is read from a first register and a second operand is read from a second register.

At step 46 a determination is made as to whether or not the mixed operand size instruction decoded at step 40 specified that signed extension should be used. If signed extension is to be used, then this is performed at step 48, which also converts the second operand to the first operand size. If signed extension is not to be performed, then zero extension is performed at step 50, which also converts the second operand to the first operand size. After both steps 48 and 50, processing proceeds to step 52 where a determination is made as to whether or not the mixed operand size instruction decoded at step 40 specified any shift was to be performed on the second operand after it had been converted to have the first operand size.

If a shift is to be performed, the step 54 shifts the second operand by the specified amount. The amount may be explicitly specified by an immediate field within the mixed operand size instruction or may be implied by the opcode or in some other way.

Step 56 determines if the operation to be performed upon the first operand and the second operation is an addition. If the operation to be performed is an addition, then this is undertaken at step 58 so as to generate the third operand. If the operation to be performed is not an addition, then step 60 performs a subtraction of the second operand from the first operand to generate the third operand. In the present examples, either an addition or subtraction is performed both when the mixed operand size instruction is an arithmetic instruction and when the mixed operand size instruction is a load instruction or a store instruction. The address calculation associated with the load instruction or the store instruction includes within it manipulations which may be either an addition or a subtraction of the first operand and the second operand.

Subsequent to either the addition at step 58 or the subtraction at step 60, a determination is made at step 62 as to whether or not the mixed operand size instruction decoded at step 48 is a load instruction or a store instruction. If the instruction is not a load instruction or a store instruction, then step 64 stores the third operand into a third register as specified by the third register specifying field 36. If the instruction is a load instruction or a store instruction, then step 66 performs the specified load or store between the address location within the memory 6 specified by the third operand and a third register serving as either the destination for the load or the source for a store.

FIGS. 5A and 5B illustrates the syntax and various options associated with a mixed operand size instruction being either a load instruction or a store instruction. Considering the mnemonic column 68 this specifies stores as "STR" and loads % DR". Whether the store is of a byte, a halfword, a word or a doubleword is indicated by the mnemonic including either "B" or "H" or the name of the register to be transferred which forms part of the opcode. Whether or not a particular load instruction sign extends or zero extends the data in memory to generate the third operand is indicated by the letter "S" which precedes the operand size letter.

The mixed operand size instructions are 32-bit instructions. The bit encoding of these instructions in the case of the load instruction and the store instruction is shown at 70. The third register specifying field is a target register R. The description column in FIG. 5 gives a brief description of the operation performed by each of the variants.

FIG. 6 is similar to FIG. 5 except that in this case the mixed operand size instructions are arithmetic instructions generating an output operand which is the result of the arithmetic operation performed. The arithmetic operation may be either an addition or a subtraction. The addition or subtraction may or may not set the result flags 28 as indicated by the "S" at the end of the mnemonic. The operand size of the first operand is specified by the name used to represent the $R_n$ register field, "Wn" indicates a 32-bit operand and "Xn" indicates a 64-bit operand where "n" is a register number between 0 and 30. The operand size of the second operand and whether it should by zero extended or sign extended is specified by the <extend> parameter which may be followed by an optional shift amount between 1 and 3. The bit encoding of the mixed operand size instructions being addition or subtractions is shown at 72. A brief description of each of the instructions is given in the description column.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data comprising:
   processing circuitry configured to perform data processing operations specified by program instructions;
   a plurality of registers, each of said registers storing a scalar operand; and
   decoder circuitry coupled to said processing circuitry and configured to decode said program instructions to generate control signals for controlling said processing circuitry to perform data processing operations specified by said program instructions; wherein
   said decoder circuitry is configured to decode a mixed operand size instruction to generate control signals to control said processing circuitry to perform a mixed size data processing operation having:
   (i) a first input operand of a first operand size stored within a first register of said plurality of registers as specified by a first register specifying field within said mixed operand size instruction;
   (ii) a second input operand of a second operand size stored within a second register of said plurality of registers as specified by a second register specifying field within said mixed operand size instruction, said second operand size being less than said first operand size; and
   (iii) a third operand of a third operand size; and
   said mixed size data processing operation including processing with a same effect as:
   (a) converting said second input operand from said second operand size to said first operand size; and
   (b) generating said third operand in dependence upon said first input operand with said first operand size and said second input operand with said first operand size, said apparatus for processing data further comprising:
   a memory having a memory address space and wherein said third operand is an address value within said memory address space, said mixed operand size instruction performing one of a load operation and a store operation between a third register specified by register specifying field within said mixed operand size instruction and data value store within said memory at said address value.

2. Apparatus as claimed in claim 1, wherein said third operand has said first operand size.

3. Apparatus as claimed in claim 1, wherein said converting said second input operand includes one of:
   sign extending said second input operand from said second operand size to said first operand size; and
   zero extending said second input operand from said second operand size to said first operand size.

4. Apparatus as claimed in claim 1, wherein said generating said third operand includes setting one of more result flags stored within said apparatus.

5. Apparatus as claimed in claim 4, wherein said one or more result flags indicate one of more of:
   said third operand is a zero;
   said third operand is negative;
   generating said third operand included generating an unsigned carry out bit of one from said third operand; and
   generating said third operand included generating a signed overflow from said third operand.

6. Apparatus as claimed in claim 1, wherein said generating said third operand includes shifting said second input operand.

7. Apparatus as claimed in claim 6, wherein said shift is by a shift amount that is specified by a field within said mixed operand size instruction.

8. Apparatus as claimed in claims 6, wherein said generating has a same effect as said shifting being performed after said second input operand has been converted to said first operand size.

9. Apparatus as claimed in claim 1, wherein said third operand is stored within a third register as specified by a third register specifying field within said mixed operand size instruction.

10. Apparatus as claimed in claim 9, wherein said generating performs an arithmetic operation upon said first input operand with said first operand size and said second input operand with said first operand size to generate said third operand.

11. Apparatus as claimed in claim 10, wherein said arithmetic operation is one of:
    adding said first input operand with said first operand size and said second input operand with said first input size to generate said third operand; and
    subtracting said second input operand with said first operand size from said first input operand with said first operand size to generate said third operand.

12. Apparatus for processing data comprising:
    processing means for performing data processing operations specified by program instructions;
    a plurality of register means for storing data, each of said register means storing a scalar operand;
    decoder means coupled to said processing means for decoding said program instructions to generate control signals for controlling said processing means to perform data processing operations specified by said program instructions; wherein
    said decoder means is configured to decode a mixed operand size instruction to generate control signals to control said processing circuitry to perform a mixed size data processing operation having:
    (i) a first input operand of a first operand size stored within a first register means of said plurality of register means as specified by a first register specifying field within said mixed operand size instruction;
    (ii) a second input operand of a second operand size stored within a second register means of said plurality of register means as specified by a second register specifying field within said mixed operand size instruction, said second operand size being less than said first operand size; and
    (iii) a third operand of a third operand size; and
    said mixed size data processing operation including processing with a same effect as:
    (a) converting said second input operand from said second operand size to said first operand size; and
    (b) generating said third operand in dependence upon said first input operand with said first operand size and said second input operand with said first operand size, and said apparatus for processing data further comprising:

a memory having a memory address space and wherein said third operand is an address value within said memory address space, said mixed operand size instruction performing one of a load operation and a store operation between a third register specified by register specifying field within said mixed operand size instruction and data value store within said memory at said address value.

13. A method of processing data using processing circuitry configured to perform data processing operations specified by program instructions, a memory having a memory address space, a plurality of registers, each of said registers storing a scalar operand and decoder circuitry coupled to said processing circuitry and configured to decode said program instructions to generate control signals for controlling said processing circuitry to perform data processing operations specified by said program instructions, said method comprising the steps of:

decoding a mixed operand size instruction to generate control signals to control said processing circuitry to perform a mixed size data processing operation having:
(i) a first input operand of a first operand size stored within a first register of said plurality of registers as specified by a first register specifying field within said mixed operand size instruction;
(ii) a second input operand of a second operand size stored within a second register of said plurality of registers as specified by a second register specifying field within said mixed operand size instruction, said second operand size being less than said first operand size; and
(iii) a third operand of a third operand size; and said mixed size data processing operation including processing with a same effect as:
(a) converting said second input operand from said second operand size to said first operand size; and
(b) generating said third operand in dependence upon said first input operand with said first operand size and said second input operand with said first operand size, wherein said third operand is an address value within said memory address space, said mixed operand size instruction performing one of a load operation and a store operation between a third register specified by register specifying field within said mixed operand size instruction and data value store within said memory at said address value.

14. A computer program product storing in non-transitory form a computer program including at least one mixed operand size instruction for controlling a computer to perform a method as claimed in claim 13.

15. virtual machine comprising a computer controlled by a computer program to provide an execution environment for executing program instructions in accordance with a method as claimed in claim 13.

* * * * *